Aug. 12, 1941.    E. MARTIN    2,252,518

POWER PLANT CONTROL MEANS

Filed May 7, 1938    3 Sheets-Sheet 1

INVENTOR.
Erle Martin
BY Harris G. Luther
ATTORNEY

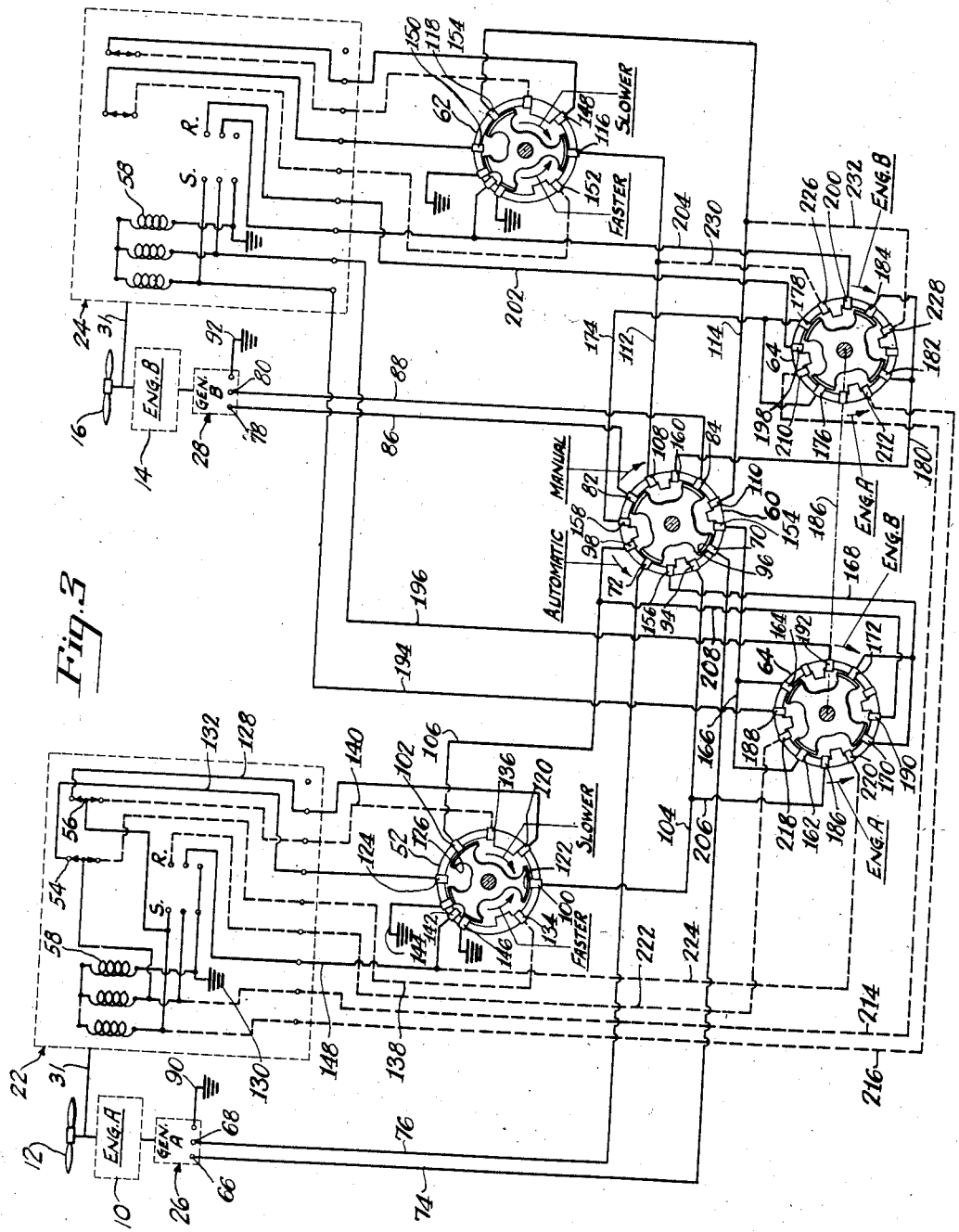

Aug. 12, 1941.  E. MARTIN  2,252,518
POWER PLANT CONTROL MEANS
Filed May 7, 1938  3 Sheets-Sheet 3
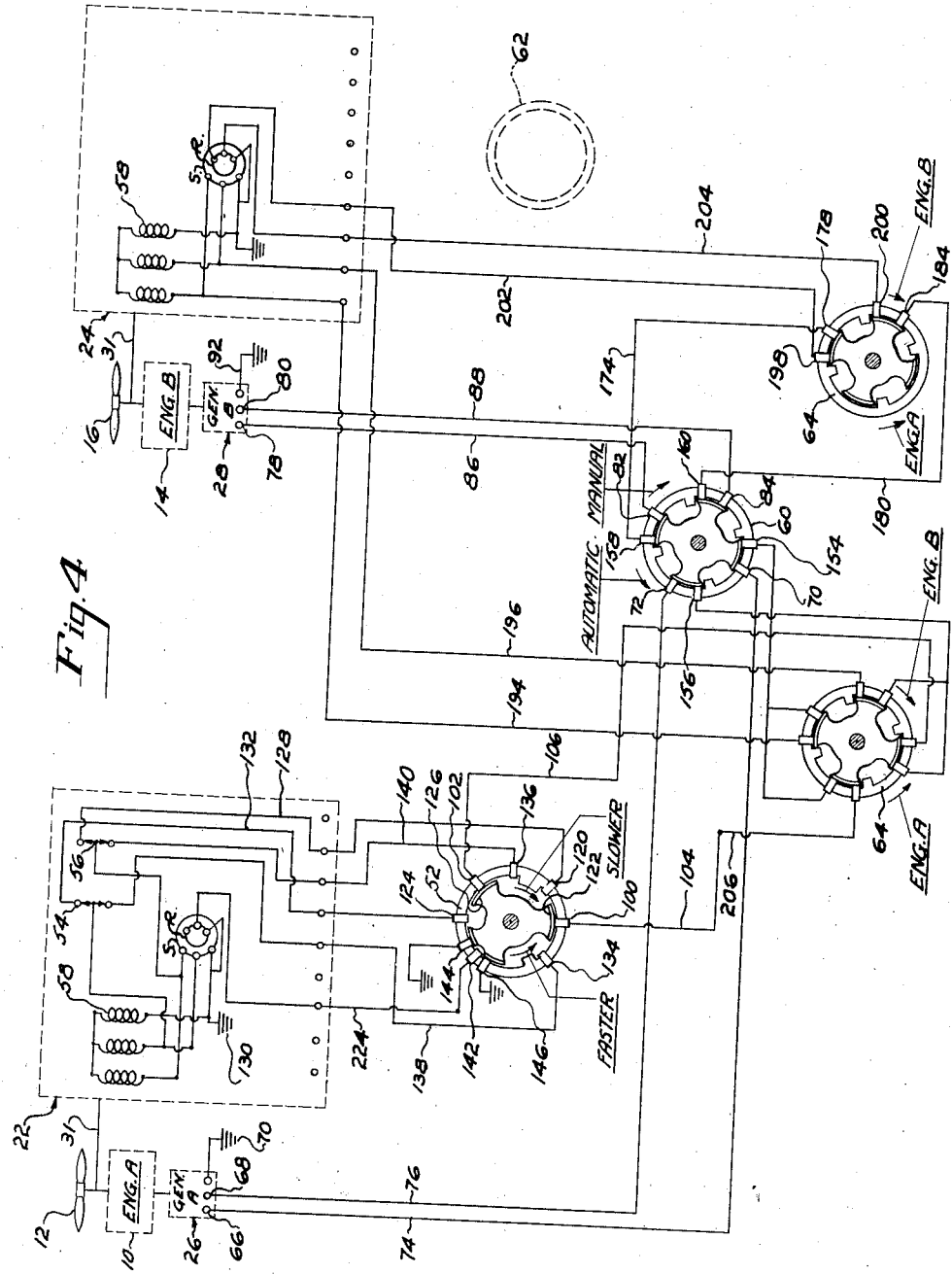
INVENTOR
Erle Martin
BY
Harris G. Luther
ATTORNEY Patented Aug. 12, 1941

2,252,518

UNITED STATES PATENT OFFICE 2,252,518

POWER PLANT CONTROL MEANS

Erle Martin, West Hartford, Conn., assignor to United Aircraft Corporation, East Hartford, Conn., a corporation of Delaware Application May 7, 1938, Serial No. 206,631

7 Claims. (Cl. 60—97)

This invention relates to improvements in power plant control means and has for an object the provision of means for controlling a plurality of engine propeller combinations used to furnish propulsive power for a vehicle such as an airplane.

A further object resides in the provision of control means so arranged that each engine propeller combination may be manually independently controlled, or one or more of the engine propeller combinations may be automatically controlled to obtain a synchronous operation of the various power plants.

A still further object resides in the provision, in combination with governors controlling controllable pitch propellers and propeller driving engines, of electrical devices for adjusting the various governors, such electrical devices being capable of operation as reversible motors for manual control and as electrical differential devices for automatic control.

Other objects and advantages will be more particularly pointed out hereinafter or will become apparent as the description proceeds.

In the accompanying drawings in which like reference numerals are used to designate similar parts throughout, there is illustrated a suitable mechanical embodiment of what is now considered to be the preferred form of the invention. The drawings however are for illustrative purposes only and are not to be taken as in any way limiting or restricting the invention as set forth in the appended claims.

In the drawings Fig. 1 is a partly sectional view of a fragmentary portion of an engine governor and governor adjusting electric motor device.

Fig. 3 is a schematic wiring diagram showing a complete system for two engine-propeller combinations whereby the electric motor devices may be utilized as independently acting governor adjusting mechanisms or may be utilized as synchronizing devices with either of the engines selectable to function as the master or reference speed engine.

Fig. 4 is a schematic wiring diagram showing those circuits shown in Fig. 3 which are used for automatic synchronization of two engines with one engine retained under manual control to function as a master engine.

Figure 1:
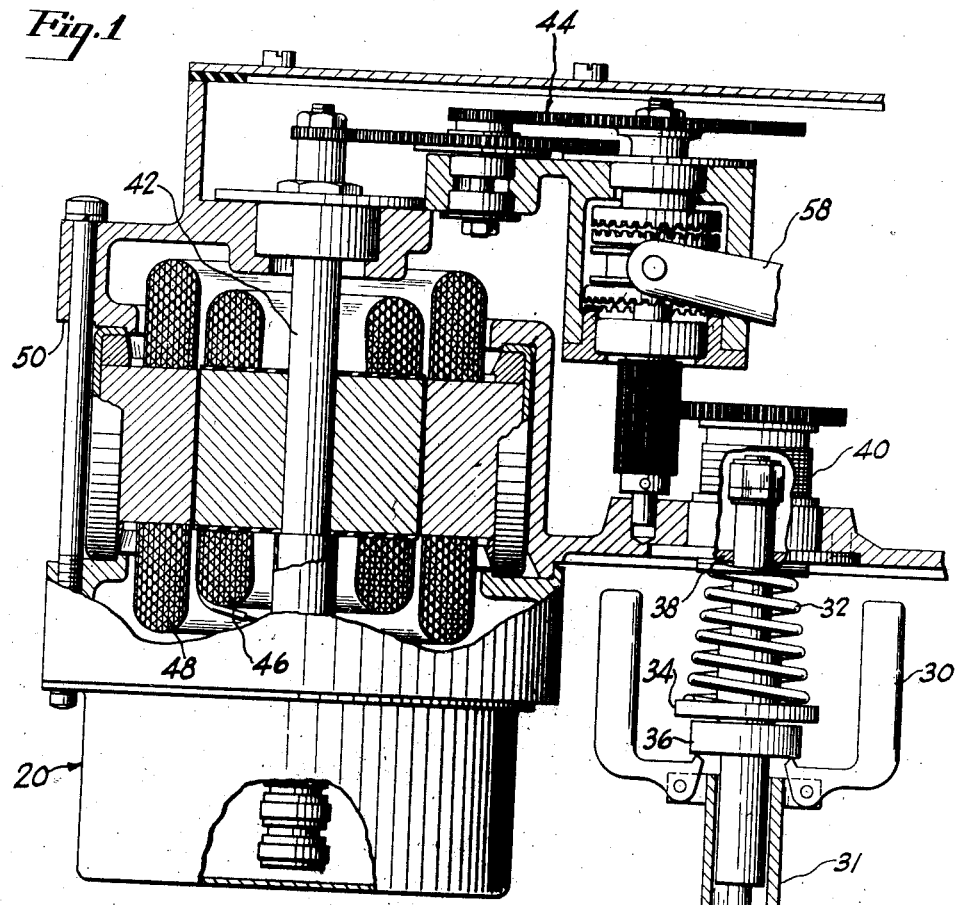

Referring to the drawings in detail the numeral 10 generally designates an engine such, for example, as an aircraft engine and the numeral 12 generally designates a controllable pitch propeller driven by the engine 10. The numeral 14, on Fig. 3, designates a second engine and the numeral 16 a controllable pitch propeller driven by the engine 14. The engines 10 and 14 and the respective propellers 12 and 16 may constitute two separate power plants utilized to furnish propulsive power for a single vehicle such as an airplane or boat. While a dual power plant arrangement has been illustrated, it is to be understood that the general arrangement may be extended to include three, four or more power plants in the control apparatus.

Figure 2:
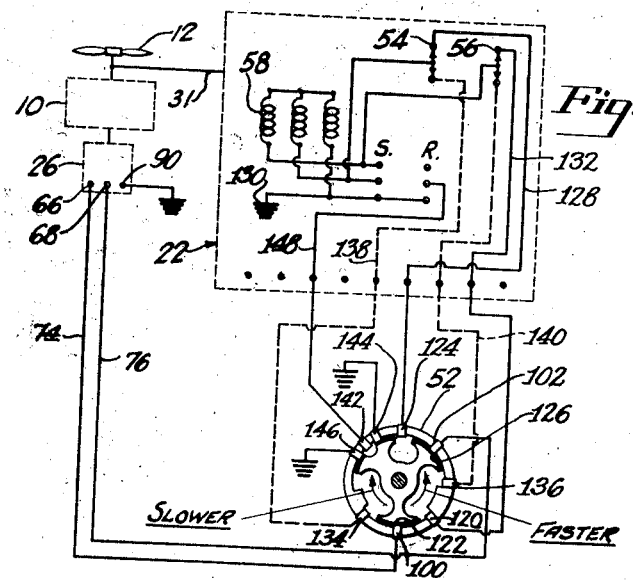
Fig. 2 is a schematic wiring diagram showing an arrangement for utilizing an electric motor device as a remote control governor adjusting mechanism.

The propellers 12 and 16 are controlled by respective engine driven governors in a manner well known to the art, the valve portion of such a governor for controlling a hydro-controllable pitch propeller being indicated by the numeral 18 in Fig. 1. In the present arrangement each governor is adjusted by an electric-motor device in the form of an electrical differential mechanism or "Selsyn," unit generally designated by the numeral 20 in Fig. 1. In Figs. 2 and 3 each combination of a governor and its respective adjusting electric-motor device has been schematically indicated as a single synchronizing unit, the synchronizing unit for the power plant comprising the engine 10 and the propeller 12 being generally indicated by the numeral 22 and the similar synchronizing unit for the power plant comprising the engine 14 and propeller 16 being generally indicated by the numeral 24 in Fig. 3.

In addition to the propeller and governor each engine also drives a respective electric current impulse generator or alternator, the generator driven by the engine 10 being generally indicated by the numeral 26 and the similar generator driven by the engine 14 being generally indicated by the numeral 28.

The governor may conveniently be of the centrifugal type having flyweights as indicated at 30 in Fig. 1 driven from the engine by a shaft 31 and opposed by a governor speeder spring in the form of a coiled compression spring 32. The governors control the pitch changing mechanism of the corresponding controllable pitch propellers in such a manner as to change the pitch of the propeller to vary the load upon the engine in response to variation in the speed of the corresponding engine from a selected value. Obviously the speed which the governor thus tends to maintain constant for the respective engine propeller combinations may be varied within wide limits by varying the loading of the corresponding speeder springs 32. The spring force is transferred to the flyballs from the lower end of the spring through the abutment 34 on thrust bearing 36, while the upper end of the spring bears against a movable abutment 38 operatively associated with the threaded slide 40 connected to the shaft 42 of the electric-motor device 20 by a suitable reduction gear unit generally indicated by the numeral 44. From this description it is apparent that rotation of the shaft 42 will adjust the governor by changing the load on the speeder spring 32 and thereby set a different speed for the engine propeller combination under the control of the particular governor.

The electric-motor device 20 includes a wound rotor element 46 secured to the shaft 42 and a wound stator element 48 secured to the casing 50. When the device 20 is used as an electrical differential mechanism the rotor 46 is connected with the windings of a multi-phase alternating-current generator and the wound stator 48 is connected with the windings of a separate multi-phase alternating-current generator. Three phase generators are ordinarily employed in this connection as giving a satisfactory operation with the simplest and most economical apparatus. Considering the simple case of an electrical differential device such as 20 having its rotor connected to one source of alternating current and its stator connected to a different source of alternating current, if the two sources are in synchronism with each other the current impulses flowing in the rotor and stator windings of the differential device will be in phase and there will be no tendency for the rotor portion to rotate relative to the stator portion. However, if the two sources are in an out of phase condition the rotor portion will rotate relative to the stator portion at a speed proportional to the speed difference between the two sources. Thus, if the electrical differential device of the synchronizing unit 24 in Fig. 3 has its stator connected with the generator 26 driven by the engine 10 and its rotor connected with the generator 28 driven by the engine 14, as long as the engine 14 is running at a speed in synchronism with the speed of the engine 10 the rotor and stator portions of the differential mechanism will remain relatively stationary. However, if the speed of the engine 14 diverges from the speed of the engine 10 the rotor element of the electrical differential portion of the synchronizing unit 24 will rotate to change the setting of the associated governor thereby changing the pitch of the propeller 16 and the speed of the engine 14 to bring the speed of the engine 14 back into synchronism with the speed of the engine 10. If the speed of the engine 10 were varied up or down by some means, such as a manual control, the speed of the engine 14 would immediately be changed until it matched the instant speed of the engine 10. Obviously a synchronizing unit 24 could be connected to the generators 26 and 28 in a similar manner to maintain the speed of the engine 10 in synchronism with the speed of the engine 14.

An electrical differential unit such as generally indicated at 20 may be converted into an induction motor by the simple process of short circuiting certain of the windings of either its rotor or stator elements and may be operated as a reversible motor by providing means for reversing the current flow through the portion used as the induction motor field. With such an arrangement the motor device 20 may be operated as an induction motor under manual control to adjust its associated governor in either direction. Such an arrangement is particularly illustrated in Fig. 2. In this arrangement the governor constituting a portion of the unit 22 may be adjusted in either direction by the associated electric-motor device, operated as an induction motor, by manipulation of the manual switch 52. This switch has a rotor portion of insulating material and conducting shoes on the contact areas. The electric-motor device is energized by the generator 26 and is operated, upon a right hand or clockwise movement of the switch 52 to adjust the governor for a slower engine speed, and upon a left hand or counterclockwise movement of the manual switch 52 to adjust the governor for a faster engine speed. In this case limit switches 54 and 56 are provided to render the motor inoperative to adjust the governor beyond a limiting position in either direction and a magnetic clutch and brake device 58 is utilized to terminate the adjustment when a desired speed change has been accomplished. The limit switches 54 and 56 are actuated by some movable part of the governor adjusting mechanism, such as the rack 48, and control the motor device 20 and the lock 58 to prevent movement in either direction beyond a predetermined limit.

In the arrangement shown in Fig. 3 a combination of circuits has been provided whereby either governor may be independently adjusted manually, or either engine may be selected as the master engine with a retention of its manual control and the other engine placed under automatic synchronous control. In this arrangement the switch 60 is a manually operable switch for selecting either manual or automatic control. When this switch is in its right hand limiting position both governors are under independent manual control, the governor in the unit 22 by the manual switch 52, and the governor in the unit 24 by the manual switch 62. Two poles 66 and 68 of the three poles of the three phase generator A are connected to contact points 70 and 72 of the switch 60 by respective conduits 74 and 76 and the two corresponding poles 78 and 80 of the three phase generator 28 are connected to the contact points 82 and 84 of the switch 60 by the respective conduits 86 and 88. One pole of each generator is grounded, as indicated at 90 for the generator 26, and 92 for the generator 28. When the switch 60 is set for manual control the contact point 70 is connected with the contact point 94 of the switch through the conductive shoe 96 on the contact portion of the switch rotor which rotor itself is made of an insulating material. The contact point 72 is similarly connected with the contact point 98 and these contact points 94 and 98 of the switch 60 are connected with contact points 100 and 102 of the switch 52 by the conduits 104 and 106. Thus the contact points 100 and 102 of the switch 52 are connected respectively with the poles 66 and 68 of the generator A. By similar arrangements including the contact points 82, 84, 108 and 110 of the switch 60 and the conduits 112 and 114 the contact points 116 and 118 of the switch 62 are connected with the poles 78 and 80 of the generator 28. With the switch 60 set for manual control the governor of the engine A may be set for faster engine operation by turning the switch 52 to the left or counterclockwise and may be adjusted for slower engine operation by turning the same switch to the right or in a clockwise direction. When the switch 52 is turned to the left the contact point 100 is connected with the contact point 120 by the conducting shoe 122 and the contact point 102 is connected with the contact point 124 by the shoe 126. The contact point 120 is connected through the conduit 128 and the limit switch with one stator winding of the motor unit 20 and at the same time with one phase coil of the brake operating solenoid 58 and through a third coil of the brake operating solenoid with a ground as indicated at 130. The contact point 124 is similarly connected through the conduit 132 and limit switch 54 with a second winding of the stator of the electromotive unit 20 and with a second coil of the brake operating solenoid and is also connected with the ground 30 through the third coil of the solenoid. One winding of the stator and one winding of the rotor of the electromotive unit are connected together or short circuited and connected with the ground connection. The circuit above described supplies current from the generator A to the stator winding of the electromotive unit 20 and causes this unit to operate as an induction motor in a direction to increase the speed setting of the engine governor spring 32. When the switch 52 is rotated to the right the contact 100 is connected with the contact point 134 and the contact point 102 is connected with the contact point 136. The contact points 134 and 136 are connected with the stator windings through the cables 138 and 140 and the limit switches 54 and 56 in a manner just the reverse of that in which the contact points 122 and 124 are connected with these same windings so that when the switch is moved to the right the direction of rotation of the electromotive device 20 will be opposite to that occasioned by rotation of the switch to the left. In each instance one of the rotor windings of the electromotive device is grounded by electrical connections of the contact point 142 with the contact point 144 or the contact point 146, the point 142 being connected with the center rotor windings by the conduit 148 and both of the points 144 and 146 being grounded. The manual control switch 62 controls the governor of the engine B in an exactly similar manner by connecting the contact points 116 and 118 with the contact points 148 and 150 for a faster speed setting and with the contact points 152 and 154 for a slower speed setting. When the switch 60 is in its limiting left hand position the governors are subject to automatic control and the master engine is then selected by the double switch 64. When the switch 64 is in its limiting left hand position the engine 10 will be the master engine and when this switch is in its limiting right hand position the engine 14 will be the master. When the switch 60 is moved to its left hand or automatic position, as mentioned above, the contact points 94, 98, 108 and 110 are disconnected from the points 70, 72, 82 and 84 thus discontinuing the above described circuits through the manual control switches 52 and 62. At the same time the contact point 70 is connected with the contact point 154, the point 72 is connected with the point 156, the point 82 with the point 158 and the point 84 with the point 160. This change in the switch 60 connects the double master engine selecting switch 64 with the generators 26 and 28 in the following manner. The contact points 162 and 164 of the switch 64 are connected with the contact point 70 of the switch 60 through the contact point 164 and conduit 166, the contact point 72 of the switch 60 is connected through the contact point 156 and conduit 168 with the contact points 170 and 172 of the switch 54. Similarly the contact point 82 of the switch 60 is connected through the contact point 158 and conduit 174 with the contact points 176 and 178 of the second part of the double switch 64 and the contact point 84 of the switch 60 is connected through the contact point 160 and the conduit 180 with the contact points 182 and 184 of the second part of the switch 64. Thus, in the automatic position of the switch 60 the generator 26 is connected to the contact points 162, 164, 170 and 172 of the first part of the double switch 64 and the generator 28 is connected to the contact points 176, 178, 182 and 184 of the second part of this switch. The two parts of the switch 64 are mounted on the common shaft 186 so that the contact points of both parts are controlled alike. Now, if the switch 64 is in its extreme counterclockwise or left-hand rotational position the engine A will be the master engine while, if this switch is in its extreme clockwise or right-hand rotational position the engine B will be the master engine. Considering first the case in which A is the master engine, generator 26 is connected with the stator winding of the electromotive device 20 of the control unit 24 of engine B through conduits 74 and 76, contact points 70, 72, 154 and 156 of switch 60, conduits 166 and 168, contact points 164, 172, 188 and 192 of switch 64, and the conduits 194 and 196. The current from generator 26 is also lead through the coil of the electromagnetic brake operator 58 so that the governor adjusting mechanism will be maintained unlocked and movable by the electromotive unit of the control 24. The generator B is connected with the rotor winding of the electromotive unit of the control 24 through the conduits 86 and 88, the contact points 82, 84, 158 and 160 of the switch 60, the conduits 174 and 180, the contact points 178, 184, 198 and 200 of the switch 64 and the conduits 202 and 204. With this arrangement the output of the generator 26 is applied to the stator winding of the electromotive device of the control 24 while the output of the generator B is applied to the rotor windings, and a phase difference in the output of the two generators will result in a rotation of the rotor with respect to the stator of this electromotive device with a consequent adjustment of the governor included in the control 24 to change the speed of the engine B. The manual control switch 52 is kept in circuit during the above described automatic control of the engine B by the engine A by two shunt connections, including the contact points 186 and 198 and the conduits 206 and 208 which connect with the conduits 104 and 106, respectively, so that the control of the master engine A may be manually adjusted by the manual switch 52. When the switch 64 is in its extreme right-hand, or clockwise, rotational position, the engine B is selected as the master engine and automatically controls the speed of the engine A and is itself subject to manual control by means of the manual switch 62. In this arrangement the generator 28 is connected to the stator windings of the electromotive device 20 of the control 22 through the conduits 86 and 88, the contact points 82, 84, 158 and 160 of the switch 60, the conduits 174 and 180, the contact points 176, 182, 210 and 212 and the conduits 214 and 216. The coils of the electromagnetic clutch 58 of the control 22 are also energized by the generator 28 to maintain the control 22 in operable condition. The generator 26 is connected with the rotor windings of the electromotive device of the control 22 through the conduits 74 and 76, the contact points 70, 72, 154 and 156 of the switch 60, the conduits 166 and 168, the contact points 162, 170, 218 and 220 of the switch 64 and the conduits 222 and 224. By this arrangement the stator windings of the electromotive device 20 of the control 22 are energized by the output of the generator 28 and the rotor windings of the same electromotive device are energized by the output of the generator 26 so that the governor of the control 22 will be adjusted upon a variation of the speed of the engine A with respect to the speed of the engine B in the manner indicated above. The engine B is maintained under manual control by means of a shunt circuit including the contact points 226 and 228 of the switch 64 and the conduits 230 and 232 which connect with the conduits 112 and 114 leading to the contacts 116 and 118 of the manual switch 52. In either case the master engine will remain under manual control by the respective manual switch 52 or 62 and the alternative engine will be maintained in synchronism with the master engine.

While a suitable mechanical embodiment has been hereinabove described and illustrated in the accompanying drawings for the purpose of disclosing the invention, it is to be understood that the invention is not limited to the particular construction and arrangement so illustrated and described and that such changes in the size, shape and arrangement of parts and in the various electrical circuits may be resorted to as come within the scope of the subjoined claims.

Having now described the invention so that others skilled in the art may clearly understand the same, what it is desired to secure by Letters Patent is as follows:

1. A speed and synchronizing control for a plurality of power plants comprising, an adjustable speed controlling governor for each power plant, an individual electric motor device including means having separately energizable stator and rotor portions operatively connected with each governor to adjust the same, an electric impulse generator driven by each power plant, means for manually controlling the energization of each electric motor device, means for retaining one power plant governor under manual control and subjecting the remaining governors to automatic control of said one power plant retained under manual control, comprising means for connecting one separately energizable portion of each electric motor device of said remaining governors to the electric impulse generator of said one power plant and connecting the other separately energizable portion of the electric motor device of said remaining governors with the electric impulse generator of their respective power plants, and means for selecting any one of said power plants for manual control.

2. A speed and synchronizing control for a plurality of power plants comprising, a speed controlling governor for each power plant, an individual current impulse generator driven by each power plant, an individual electromotive device operatively connected with each governor for adjusting the same, each electromotive device having separately energizable stator and rotor portions relatively rotatable in response to a phase difference in the electric current supplied respectively thereto, means for utilizing each electromotive device as a manually controlled motor energized by the generator of the respective power plants, means for manually controlling the operation of each motor when so utilized, means for simultaneously connecting one portion of each electromotive device to one of said generators and the other portion to the generator of the respective power plants to render all of said devices except the one on the power plant driving said one generator responsive to a speed difference between said one generator and the generator of the respective power plants to control the respective governors, means for manually controlling the electromotive device on the power plant driving said one generator, and means for changing said connection to connect one portion of each electromotive device to any selected one of said generators and maintain the electromotive device on the power plant driving said selected generator subject to manual control.

3. In a multiple power plant speed and synchronizing control in which each power plant is equipped with a speed controlling governor, an electrically actuated remote control adjusting motor for each governor, a motor driving generator driven by each power plant, means for manually controlling each motor individually, means for selecting any power plant as a master and placing the remaining power plant under the automatic control of said master power plant including means for establishing an electric connection which will convert a phase difference in the output of said generators into a speed change controlling adjustment of the governor of the remaining power plant, and means for manually controlling the speed of the selected master power plant.

4. In a multiple power plant speed and synchronizing control in which each power plant is equipped with a speed controlling governor, an electrically actuated remote control adjusting motor for each governor, a motor driving generator driven by each power plant, an individual switch for manually controlling each motor separately, switching means for interconnecting said generators and motors in a manner to establish one of said power plants as a master power plant and to cause a difference in speed of the generator of the master power plant and the speed of the generator of each remaining power plant to change the setting of the motor controlled governor of the respective remaining power plant to automatically synchronize the speeds of the remaining power plants to the speed of said master power plant, and switching means for selecting any one of said power plants as the master power plant and simultaneously rendering said master power plant subject to manual control through its individual manual control switch.

5. A speed and synchronizing control for a plurality of power plants comprising, a speed controlling governor for each power plant, an individual current impulse generator driven by each power plant, an individual electromotive device operatively connected with each governor for adjusting the same, each electromotive device having separately energizable stator and rotor portions relatively rotatable in response to a phase difference in the electric current supplied respectively thereto, means for utilizing each electromotive device as a manually controlled motor energized by the generator of the respective power plants, means for manually controlling the operation of each motor when so utilized, means for simultaneously connecting one portion of the electromotive device, on each power plant to be synchronized, with the generator on a selected power plant and the other portion with the generator of the respective power plants to be synchronized to render all of said devices except the one on the selected power plant responsive to a speed difference between the generator on said selected power plant and the generator of the respective power plant to control the respective governors, means for manually controlling the electromotive device on the selected power plant, and means for changing said connection to select the generator on any of said power plants, to connect one portion of the electromotive devices on each of the remaining power plants with the selected generator and to maintain the electromotive device on the power plant driving the selected generator subject to manual control.

6. In a common control for a plurality of associated power plants, an adjustable governor operatively associated with each power plant for controlling the speed thereof, an electric motor operatively associated with each governor for adjusting the same, an electric generator associated with each power plant and driven at a speed bearing a fixed relation to the speed of its respective power plant, means for selecting one of said power plants as a master power plant and connecting the electric motor of the other associated power plant to the generator of said master power plant and to the generator of said other associated power plant to subject said motor to the effects of speed differences between the generator of said master power plant and the generator of said other associated power plant, means for manually controlling the governor of the selected master power plant, and means for changing the electric connections to select the said other power plant as the master power plant and connecting the electric motor of said one power plant to said generators, and means for manually controlling the governor associated with said other power plant.

7. In a control for a plurality of associated power plants including a master power plant and a synchronized power plant, the combination of an adjustable governor operatively associated with each power plant for controlling the speed thereof, adjusting means for each governor including a manually controlled electric motor, an electric generator associated with each power plant and driven at a speed bearing a fixed relation to the speed of its respective power plant, means interconnecting said generators and said governor adjusting means for electrically comparing the speeds of said synchronized power plant with the speed of said master power plant and electrically translating any speed differences into a movement of the governor adjusting means of the synchronized power plant to correct said speed differences, means for interchanging the relation of said power plants comprising means for changing the connections of said interconnecting means whereby one of the synchronized power plants becomes a master power plant whose governor is subject to manual control by its manually controlled electric motor and the synchronized power plants continue to be synchronized by the interconnected generators and governor adjusting means, and means for disabling the interconnecting means to render each governor adjusting means subject to electric control only by said manually controlled electric motor.

ERLE MARTIN.